United States Patent [19]

Mackrle et al.

[11] Patent Number: 5,032,276

[45] Date of Patent: Jul. 16, 1991

[54] METHOD OF BIOLOGICAL ACTIVATING WATER CLEANING WITH FLUID FILTRATION

[75] Inventors: Svatopluk Mackrle, Brno; Vladimír Mackrle, Bratislava, both of Czechoslovakia

[73] Assignee: Incotex statni podnik, Brno, Czechoslovakia

[21] Appl. No.: 360,248

[22] Filed: Jun. 1, 1989

[30] Foreign Application Priority Data

Jun. 2, 1988 [CS] Czechoslovakia .................... 3802-88

[51] Int. Cl.⁵ .............................................. C02F 3/30
[52] U.S. Cl. .................................... 210/629; 210/630; 210/195.3
[58] Field of Search ..................... 210/626, 195.3, 629, 210/630, 195.1, 201, 252, 255

[56] References Cited

U.S. PATENT DOCUMENTS

| | | |
|---|---|---|
| 3,878,097 | 4/1975 | Mochizuki et al. .......... 210/195.3 X |
| 3,883,424 | 5/1975 | Stamblesky et al. ........ 210/195.3 X |
| 4,006,085 | 2/1977 | Matteson .......................... 210/195.3 |
| 4,008,159 | 2/1977 | Besik .............................. 210/195.3 X |
| 4,844,800 | 7/1989 | Brucker ............................. 210/195.3 |

Primary Examiner—Tom Wyse
Attorney, Agent, or Firm—Beveridge, DeGrandi & Weilacher

[57] ABSTRACT

In order to improve the efficiency of biological reactors for water cleaning with fluid filtration, the activated sludge descending from the space of the fluid filter is simultaneously forcibly sucked-off into the activating space due to a stream of the activating mixture in the close neighborhood of the stream of the returning activated sludge at the place of its entrance into the activating space. Pumping can be applied for the sucking-off function.

6 Claims, 3 Drawing Sheets

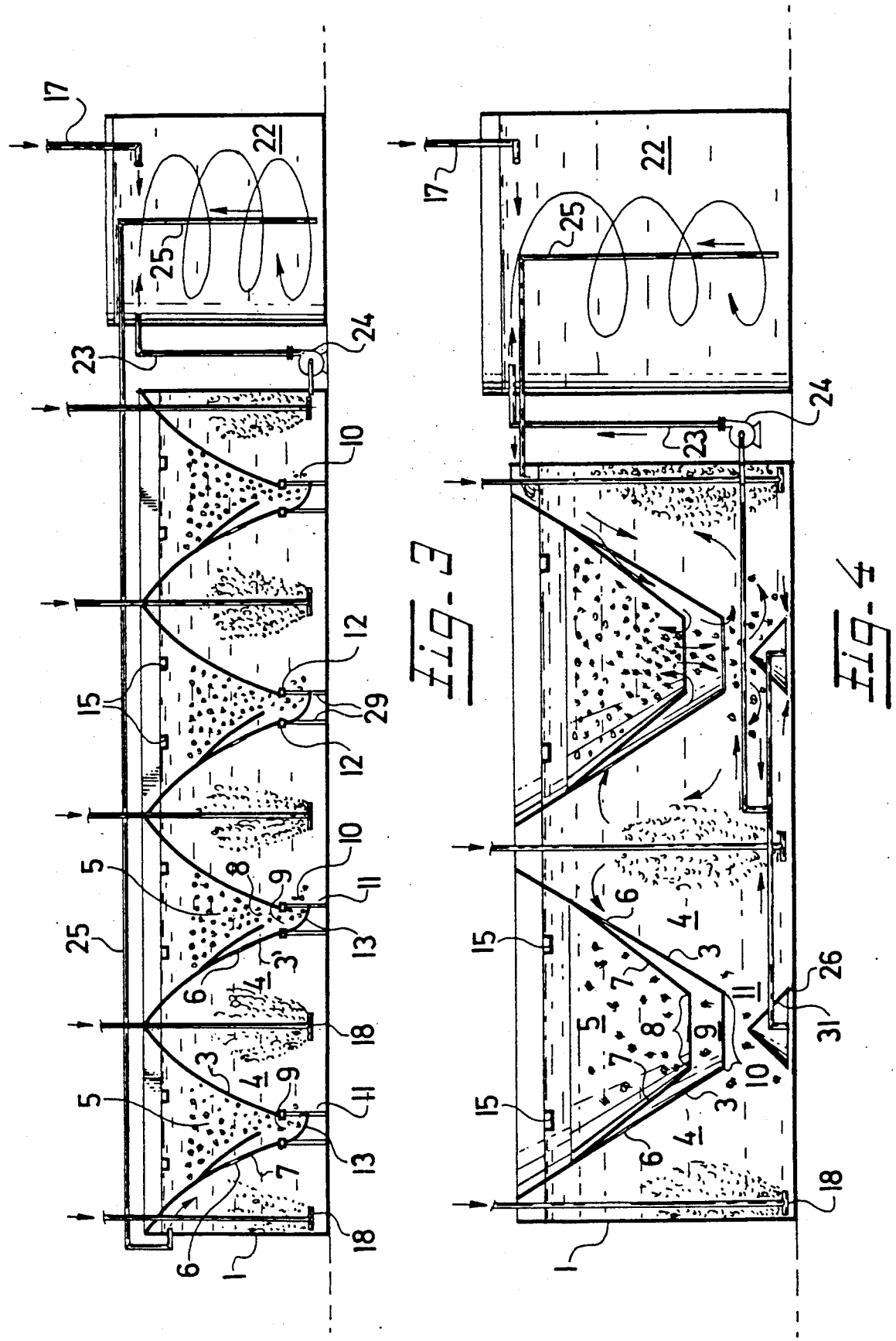

METHOD OF BIOLOGICAL ACTIVATING WATER CLEANING WITH FLUID FILTRATION

BACKGROUND OF THE INVENTION

The invention relates to biological activating water cleaning with fluid filtration with automatic return of activated sludge from the fluid filter back into the activation process and to arrangements for execution of said method.

Fluid filtration has become more and more the main intensification factor in the technology of biological water cleaning. A larger application of this progressive technique has, however, up to now been prevented by some operational difficulties; particularly, at small and very small arrangements and also the somewhat reduced efficiency of separation in the case of cleaning waste water containing nitrogenous compounds and requiring nitrification and denitrification. In addition, more and more expressively, a further intensification of the cleaning process of actual arrangements utilizing fluid filtration is of importance.

Operation difficulties are, for instance, experienced at reactors utilizing fluid filtration with closed cylindrical vessels. Said types of reactors are suitable for cleaning of local sources of sewage waters. Specific requirements for a solution to the problems associated with such arrangements follows both from a need for an automated operation and a need for high reliability. Moreover, there is also high requirements for incorporation of cleaning stations into an ecologically exposed environment, for instance, in a recreation center.

Other specific requirements follow from attempts to achieve comparable costs of water cleaning with costs of operation of large cleaning stations. Up to now, all known reactors with fluid filtration, offer certain drawbacks. Present solutions involving hydraulics of fluid filtration do not prevent clogging of the inlet slot which opens into the space for fluid filtration of small stations; that is, into the space for separation, with a following obstruction. This tendency for clogging of the separation space is common among methods of fluid filtration and among corresponding types of arrangements and is highly problematic especially when smaller capacities are concerned. In utilization of arrangements with fluid filtration where the separation space is accessible, removal of such a functional failure is easy and quick even without interruption of operation. In the case of a closed cylindrical reactor, it is, however, more difficult and requires putting the station out of operation.

With some types of cylindrical reactors, having a separation space dividing the space of the vessel into two activating spaces, another difficulty is experienced; in that "dead" zones are created in the lower part of the activating space below the level of the separating space; that is, those places having a tendency for sedimentation of the activated sludge. This sedimentation takes place particularly when the operation is interrupted, whereby the settled sludge cannot—due to the following aeration—be again taken along into the ascending stream by a stream of the activating mixture. This settled sludge starts at anaerobic conditions to decay and causes operational difficulties and a reduced efficiency of cleaning. In order to secure a corresponding flow at these "dead" zones, a rather demanding system of rectifying walls and an increased amount of power are required for a perfect suspension of the activated sludge. All that of course requires increased investment and operation costs.

Another drawback of actually known embodiments presented in the prior art, particularly those involving cylindrical reactors for biological water cleaning, is their limited capacity. An improvement requires either large vessel dimensions or restriction of their application for the smallest of cleaning stations.

In addition to said specific drawback of cylindrical reactors, all small cleaning stations have a common drawback, namely relatively higher specific costs for cleaning of waste water surpassing even multifold costs of larger and large cleaning stations both regarding the range of specific investment costs and also of operational costs.

The deciding share of costs for wages and attendance and maintenance is, for small cleaning stations, unproportionally high. Thus a rather important factor for said small stations is a complete automation and simultaneous reliability of operation, both of which have been, up to now, impossible to fully secure with prior art types of cylindrical cleaning stations with fluid filtration.

Another cause of a certain limitation in utilization of fluid filtration, is the reduced capacity of separation at a higher value of the sludge index; that is, in the situation involving the creation of a light activated sludge. A tendency to create an activated sludge of this kind requires many kinds of waste waters and operations of cleaning stations with introduced denitrification. As the reduction of the capacity of separation has an exponential character in dependence on the sludge index, a small increase of the value of the sludge index results in a substantial reduction of the capacity of said arrangement.

An increase of the capacity of separation thus represents a possibility of a substantial intensification of operation of cleaning stations, which in the case of known cleaning stations with fluid filtration, has not been fully utilized.

A substantial problem of cleaning stations with fluid filtration is frequently the so-called post-denitrification in the layer of the fluid filter caused by lack of oxygen in this layer. In an anoxidal medium of a fluid filter a post-denitrification takes place, whereby part of remnant nitrates are reduced by denitrification processes to gaseous nitrogen, which causes the flotation of sludge, the removal of which is complicated and frequently leads even to a reduction of quality of the cleaned water.

SUMMARY OF THE INVENTION

It is an object of this invention to eliminate or at least to reduce substantially the above-mentioned drawbacks. According to this invention the activated sludge descending from the fluid filter, is drawn or sucked-off into the activating space.

This sucking-off of the activated sludge can be accomplished either by positioning the stream of the activated mixture close to the stream of the returning activated sludge entering the activation space or by the suction effect of the activating mixture pumped into the activating process, possibly by pumping over a part of the activated sludge in the course of the final stage of its descending in the separation process of the activation.

The arrangement according to this invention comprises a rectifying wall joining the lower edge of a partition wall, the termination of which rectifying wall forms with the lower edge of the opposite partition wall an outlet of the activated sludge in the neighborhood of a connection channel between oxidation zones and between where faces of the mantle passages are formed. An advantageous embodiment includes an undulated shaped wall provided in the lower part of the mantle in front of the connecting channel.

According to an alternative embodiment, the oxidation zone is connected by a pump with the anoxidation zone with an inlet and outlet terminating into the opposite part of the oxidation zone.

Below the outlet a collecting cone with openings can be provided. The collecting cone is connected to a pump and the outlet part of the pump is connected to a circulation conduit, one branch of which is terminated into the oxidation zone and another part into a distribution space created by a mantle, provided in the separation space.

In order to improve the efficiency of some actual solutions, it is according to this invention advantageous if, in the lower part of the separating space, the end of a suction conduit of a pump, for instance, of an airlift pump, is provided.

DESCRIPTION OF THE DRAWINGS

Exemplary embodiments of the object of this invention will be described in detail with reference to the following drawings, wherein:

FIG. 3 is a cross-sectional elevation of a rectangular biological reactor with fluid filtration, FIGS. 4 and 5 represent cross-sectional elevations of biological reactors with fluid filtration of the shape of vertical cylindrical vessels with vertical axis.

DESCRIPTION OF PREFERRED EMBODIMENTS

Figure 1:
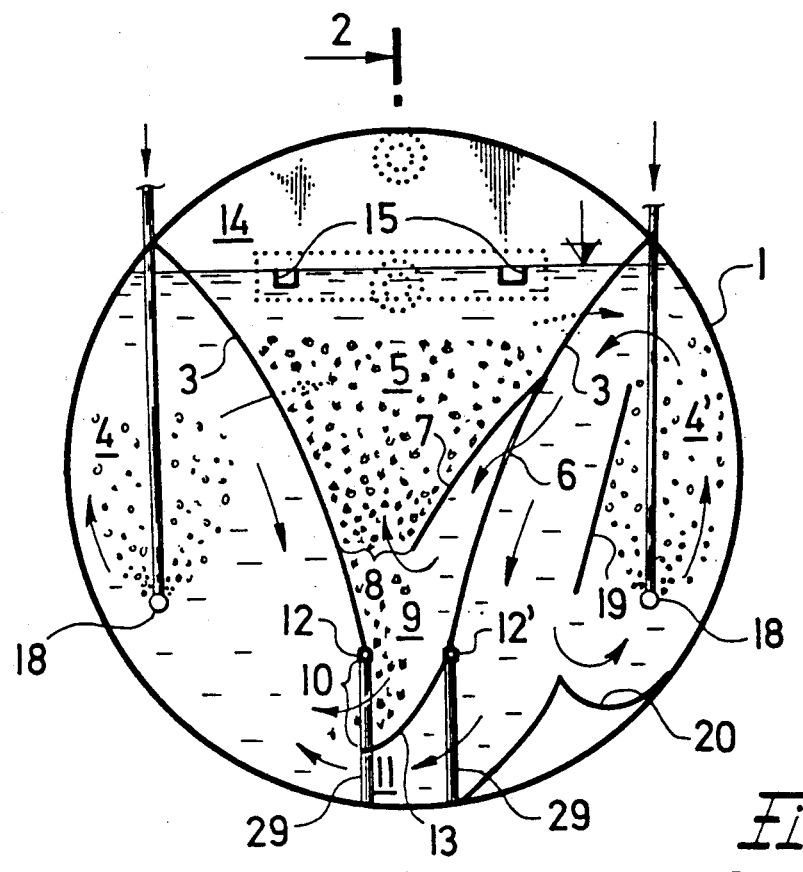
FIG. 1 is a diagrammatical cross-sectional view of a biological reactor with fluid filtration of the shape of a cylindrical vessel with a horizontal axis.
Figure 2:
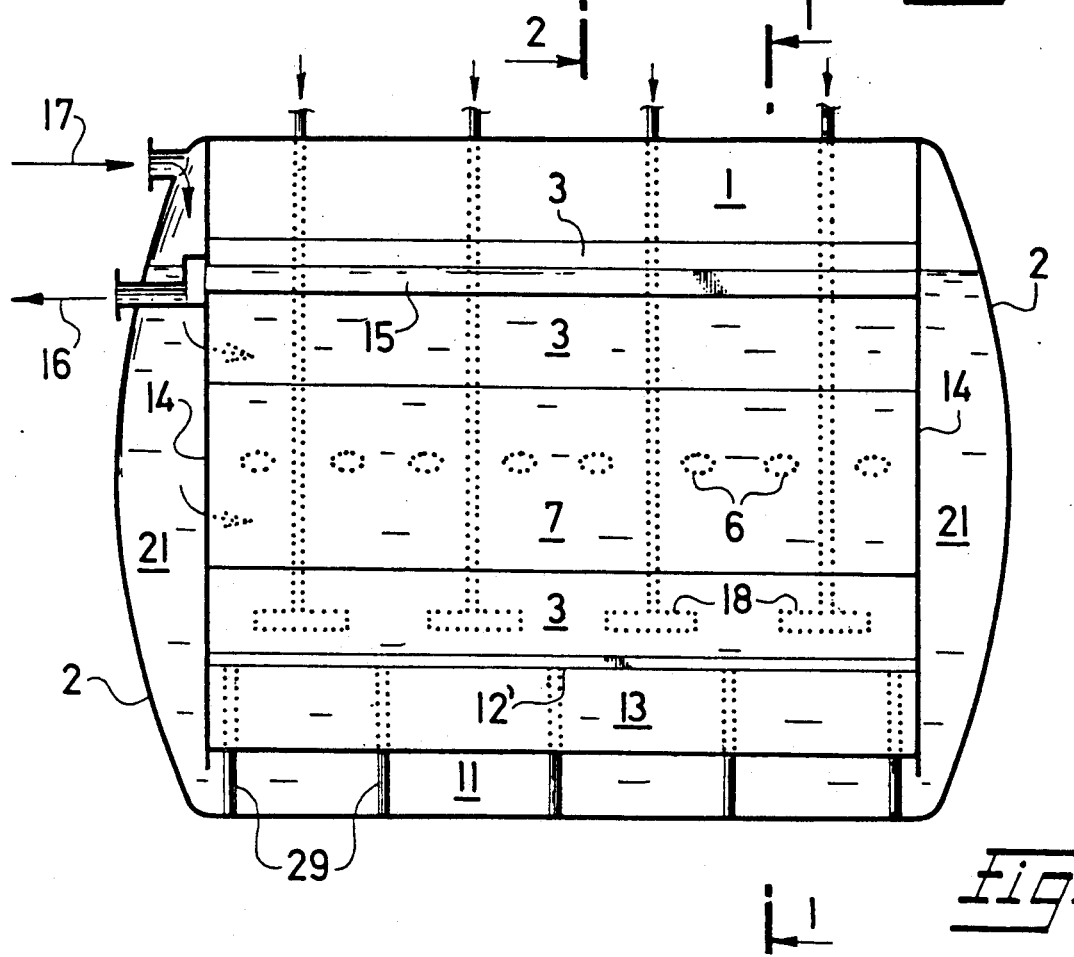
FIG. 2 is a corresponding vertical sectional view of the section taken along a plane indicated in FIG. 1 by A—A.

The biological reactor with fluid filtration as shown in FIGS. 1 and 2 is suitable for smaller outputs comprising a simple cylindrical mantle 1 with horizontal axis and faces 2. The internal space of said cylindrical vessel is divided by inserted partition walls 3,3' advantageously of arcuate shape to two oxidation zones 4,4' of activation, between which a separating space 5 is formed which widens in the upward direction.

The partition walls 3,3' are fastened by their upper parts directly to the mantle 1 of the cylindrical vessel and by their lower edges on supports 12 which are anchored to the bottom of the vessel on the mantle 1 for instance by posts 29,29'. The mentioned oxidation zones 4,4' of activation are mutually interconnected by communication systems. The first communication system is formed by inlet openings 6 in the partition wall 3' which are overlapped by a rectifying wall 7 which forms by its lower edge together with the opposite partition wall 3 an inlet slot 8 into the layer of a fluid filter in the separation space 5. Part of this communication system is a return channel 9 between lower parts of partition walls 3,3' below the inlet slot 8 which channel 9 terminates by an outlet 10 formed by the lower edge of the partition wall 3 and by a rectifying wall 13 joined to the lower edge of the partition wall 3'.

The second communication system is represented by a connecting channel 11 formed by the rectifying wall 13 and the lower part of the mantle 1 of the cylindrical vessel, which connecting channel 11 is separated from the return channel 9 by the rectifying wall 13.

The third communication system is formed by at least one passage 21 (see FIG.) between faces 2 of the vessel and the wall 14 of the separating space 5. A collecting system for removal of cleaned water, for instance troughs 15, connected to an outlet 16 of cleaned water are provided in the upper part of the separation space 5.

A supply 17 of raw water, advantageously of point shape, terminates in the face wall 2 of the cylindrical vessel. Both oxidation zones 4,4' of activation are provided with known aeration elements connected to a not shown source of pressure air.

The oxidation zone 4' of activation is for rectification of the stream of the activating mixture into the connecting channel 11 provided with a lateral rectifying wall 19 and with an undulated shaped wall 20 at the bottom of the vessel.

The described arrangement operates according to the method according to this invention as follows. By way of the supply 17 raw waste water is supplied to a single place of the oxidation zone 4,4' of activation. Both oxidation zones 4,4' are intensively aerated by pressure air by means of aeration elements 18. Due to the stream of dispersed air the activation mixture is caused to start a gyrating motion. The lateral rectifying wall 19 situated in the oxidation zone 4' of activation rectifies the stream of the activation mixture to the lower part of the vessel where the connecting channel 11 is situated so that a part of the stream is transferred to the oxidation zone 4 of activation and a second part of said stream is returned back to the aeration elements 18 and is subsequently taken along upwards due to the air lift effect due to aeration of the activating mixture as indicated by arrows. In order to distribute better both streams an undulated shaped wall 20 is provided on the bottom of the vessel of a hydraulically suitable shape as indicated in FIG. 1.

The activating mixture flowing through the connecting channel 11 to the oxidation zone 4 of activation returns in the course of proceeding activation to the oxidation zone 4' of activation by way of passages 21 close to the face walls of the vessel determined by walls 14 of the separating space 5 (see FIG. 2). Thus an intensive streaming of the activating mixture below the outlet 10 from the separating space 5 is achieved.

The mentioned forced streaming within the zone close to the outlet 10 of the separating space 5 substantially contributes to the gravitational return movement of the activated sludge retained in the fluid filter in the separation space back into the activation with a simultaneous securing of the required circulation between individual functional zones of the reactor. Due to this increase of intensity of return of the activated sludge into the activation the efficiency of separation processes is increased by 50 to 100% which enables a substantial intensification of the whole cleaning process. In addition thereto, the elimination of creation of "dead" zones in a cylindrical reactor and the prevention of sedimentation of activated sludge in the lower parts of oxidation zones 4,4' of activation is achieved simultaneously with the possibility of elimination of clogging of the inlet slot 8 in case of intermittent operation due to the rinsing effect of the described streaming. The intensive mixing of the whole content of the activation enables also a so-called "point" input 17 of raw water into the reactor.

The stream of activated mixture entering over inlet openings 6 from the oxidation zone 4' into the separating space 5 is first rectified by the rectifying wall 7 to the lower part thereof, whereby the activating mixture flows over the inlet slot 8 into the fluid filter within the separation space 5. After filtration by the fluid filter the cleaned water is removed by way of troughs 15 and leaves over the outlet 16 of cleaned water into a recipient.

The activated sludge retained in the fluid layer descends due to gravity into the lower part of the separating space 5, falls through the inlet slot 8 and the return channel 9 and returns over the outlet 10 into the adjacent activation zone 4 of activation, whereby gravitation forces advantageously provide a take along force due to the streaming in the connection channel 11. The effect of this forced circulation of the activated sludge between oxidation zones 4,4' of activation substantially contributes to the intensity of return of the activated sludge, enabling thus the mentioned higher efficiency of separation.

The described arrangement is of course not limited to a cylindrical vessel, it can be advantageously also applied for vessel of other shape, for instance for vessels of rectangular cross-section. In case of rectangular vessels, the passages 21 indicated in FIG. 2 can be omitted and the separation spaces can be extended up to the opposite vertical walls of the mantle 1 of the rectangular vessel. The required circulation is thereby obtained so that while in one-half of length of one or more separation spaces the rectifying wall 13 and the outlet 10 are oriented in one direction, in the second part of length of one or more separation spaces the rectifying wall 13 and the outlet are oriented in the opposite direction. This solution is not indicated in the attached drawings.

The arrangement shown in FIG. 3 represents a biological reactor with fluid filtration for water cleaning with an oxidation zone 22 of activation suitable particularly for larger cleaning stations of waste water requiring denitrification. Identical and equivalent elements are designated by same reference marks as at arrangement shown in FIGS. 1 and 2.

With an open rectangular vessel with a mantle 1 are delimitated separation spaces 5 by partition walls 3,3' with a corresponding number of oxidation zones 4 of activation. In addition to oxidation zones of activation an anoxidation zone 22 of activation for denitrification is joined. The oxidation zone 4 and the anoxidation zone 22 of activation are interconnected in a closed circle in such a manner, that the anoxidation zone 22 of activation is connected by an outlet 25 to the first oxidation zone 4 and the last oxidation zone 4 is connected over a circulation conduit 23 provided with a pump 24 back to the anoxidation zone 22 into which simultaneously the input 17 of raw water terminates.

Both the end of the circulation conduit 23 and also the input 17 of raw water are arranged tangentially in order to generate a rotational movement of the activating mixture in the anoxidation zone 22. The outlet 25 terminates near the bottom of the anoxidation zone 22.

Similarly as in the first exemplary embodiment shown in FIGS. 1 and 2 each separating space 5 is provided with a rectifying wall 7 overlapping the inlet openings 6, the inlet slot 8 into the space containing the layer of the fluid filter, the return channel 9 and the outlet 10 below which the connecting channel 11 is created between the rectifying wall 13 and the bottom of the rectangular vessel. All separating spaces 5 have the same arrangement of mutual interconnection securing both a communication between oxidation zones 4 and separating spaces 5 and also between individual oxidation zones 4. The activating mixture arriving from the anoxidation zone 22 enters the first oxidation zone 4 and consecutively proceeds in parallel by two streams both over inlet openings 6 and inlet slots 8 over the separation spaces 5 and also over connecting channels 11 and oxidation zones 4. Each oxidation zone 4 of activation is provided with an aeration system with aeration elements 18. The separation space 5 is in its upper part provided with collecting troughs 15 for removal of clean water.

The method according to this invention proceeds in this case as follows The raw water enters over the input 17 the anoxidation zone 22 of activation, where also the circulation conduit 23 terminates tangentially. The power of both entering streams generates a circulating movement in the anoxidation zone 22 securing an optimum utilization of the anoxidation zone for proceeding denitrification processes. If the power of entering streams is not sufficient to maintain a perfect suspension of the activated sludge it is possible to provide the anoxidation zone 22 with a mixing device. The denitrification processes require an organic substrate which is provided by the entering waste water. As nitrogen is in the shape of ammonia and organic nitrogen in the raw water, it has to be transformed into a nitrate shape of nitrogen in order to enable to eliminate nitrogen from the water by denitrification processes to gaseous nitrogen, the activating mixture is removed from the lower part of the anoxidation zone 22 by way of the outlet 25 into the oxidation zone 4 of activation. Oxidation processes are proceeding with a biological degradation of organic contaminations together with oxidation of ammonia and organic nitrogen to nitrates. In order to secure solved oxygen, the oxidation zones 4 are provided with an aeration system with aeration elements 18.

The mentioned anoxidation zone 22 of activation serves for reduction of nitrates generated in the oxidation zone. Said consecutive processes of nitrification and denitrification proceed in a circulating circuit between oxidation zones 4 and the anoxidation zone 22 of activation. This circulating circle provided with a pump 24 secures thus the required intensity of streaming in the connecting channels 11 between individual oxidation zones 4 and the anoxidation zone 22 of activation. The intensity of this stream depends on the extent of contamination of waste water by nitrogenous materials and on the requirement of efficiency of cleaning. This circulation is sufficient for obtaining the required increase of efficiency of fluid separation in case of the first exemplary embodiment shown in FIGS. 1 and 2 and to obtain a high efficiency of removal of nitrogenous materials in cases of a higher contamination.

In case of need of an increased efficiency of the fluid separation, it is in similar cases possible to use a combination of a required intensity of forced streaming by means of a pump 24 with a required intensity of forced streaming due to a circulating movement of the activation mixture in the oxidation zone 4 similarly as the effect is achieved at the preceding exemplary embodiment.

The importance of achievement of an efficiency of separation and thus also of an increased hydraulic capacity of separation causes not only that the whole arrangement can be smaller as it is the case at the exemplary embodiment according to FIGS. 1 and 2, but also that by this method realized at arrangements with nitrification and denitrification the negative influence of post-denitrification in the layer of the fluid filter is prevented. That is prevented by an increased supply if dissolved oxygen into the fluid filter by an increased hydraulic load. The presence of dissolved oxygen created thereby in the layer of the fluid filter an oxidizing medium which prevents facultative microorganisms to release oxygen from residual nitrates and thus formation of gaseous nitrogen which would cause flotation of the activated sludge in the separation space 5. Thus the negative influence of post-denitrification in the fluid filter is completely eliminated, what contributes substantially to an efficient filtration in the fluid filter and thus to the quality of the cleaned water.

In addition to the increased efficiency of separation the described streaming achieves a uniform mixing of the returned activated sludge from the separating space 5 to the whole volume of the activating mixture, what furthermore increases the efficiency of cleaning processes.

The proper separation of the activated sludge proceeds in the layer of the fluid filter in separating spaces 5, where the activating mixture is supplied from oxidizing zones 4 of the activation by way of inlet openings 6. The stream of the activating mixture is rectified by rectifying walls 7 into the lower part of separating spaces 5 and enters the fluid filter over inlet slots 8.

The cleaned water is, after passage through the fluid filter, removed over troughs 15 situated in the upper part of the separating space 5. The suspension of the activated sludge retained in the course of filtration descends due to gravity into the lower part of the separating space 5 over the inlet slot 8, the return channel 9 ending by the outlet 10 and returns into the activation, being sucked-on by the circulating stream in the connecting channel 11. The sucking-off of thickened activated sludge increases substantially the intensity of return of this sludge from the separating space 5, what considerably increases the capacity of fluid filtration in case the separation is charged by certain materials as has been mentioned earlier.

The reactor according to the embodiment shown in FIG. 4 has the shape of a vertical cylindrical vessel with a vertical axis, comprising a mantle 1 in which a number of separating spaces are situated, determined by conical partition walls 3 have inlet openings 6 which are overlapped by conical rectifying walls 7 which by their lower edges form inlet openings 8 into the fluid filter in the separating space 5. The separating space 5 communicates over the return channel 9 with that outlet 10 with the oxidation zone 4 of activation. On the bottom of the reactor below the outlets 10 are provided collecting cones 31 with openings 26. A connecting channel 11 is arranged between the lower edge of the return channel 9 and the collecting cone 31.

The collecting cones 31 are by a circulation conduit 23 provided with a pump 24 connected to the anoxidizing zone 22 of activation. The supply 17 of raw water terminates into the anoxidation zone 22. Both the end of the circulation conduit 23 and the supply 17 of raw water are terminating in the upper part of the anoxidizing zone 22 tangentially. The outlet 25 terminates near the bottom of the anoxidizing zone 22 and leads to the oxidizing zone 4.

Figure 5:
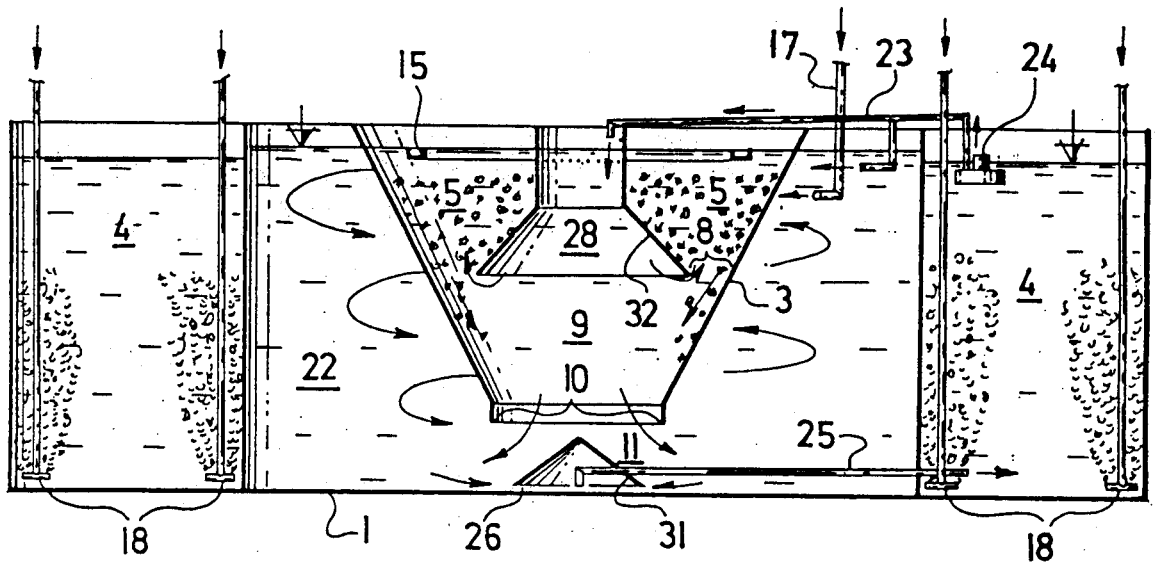

Another embodiment shown in FIG. 5 operates in the same manner as the exemplary embodiment from FIG. 3, the arrangement as in FIG. 5 being solely another possibility of realization of a reactor according to this invention. An anoxidizing zone 22 is centrally inserted in a cylindrical vessel with a mantle 1 with a vertical axis. The oxidizing zone 4 of activation is similarly as in preceding exemplary embodiments provided with an aeration system with aeration elements 18. The conical separating space 5 formed by a partition wall 3 is inserted in the anoxidizing zone 22. The separating space 5 communicates with the oxidizing zone 4 by the return channel 9 terminating with the outlet 10.

A collecting cone 31 is provided below the outlet 10, connected by the outlet 25 with the oxidizing zone 4. the oxidizing zone 4 is connected with the anoxidizing zone 22 by circulation conduit 23, connected to a pump 24. A branch is brought out from the circulation conduit 23 terminating into the distribution space 28. Below the mantle 32, the lower edge of which forms together with the partition wall 3 the inlet slot 8 into the fluid filter. After passage through the fluid filter the cleaned water is removed by way of troughs 15.

The reactor shown in FIG. 5 operates as follows. The raw water is supplied by the input 17 into the upper part of the anoxidizing zone 22 where also the circulation conduit 23 terminates tangentially, connected to a pump 24. The power of both entering streams creates a circulating movement preventing any sedimentation of the activated sludge in this zone. A part of the circulated mixture from the oxidizing zone 4 into the anoxidizing zone 22 is switched off by the branch 27 into the distribution space 28 situated in the separating space 5. The activating mixture is in the distribution space 28 rectified into the lower part of the separation space 5 wherefrom it enters over the inlet slot 8 the fluid filter in the separating space 5. The cleaned water is thereafter removed over troughs 15. The suspension of activated sludge retained in the filter descends through the inlet slot 8 and the return channel 9 terminating by the outlet 10, wherefrom it returns into the oxidizing zone 4 at a simultaneous action of the mentioned suction effect, increasing thereby substantially the output of the reactor.

Due to the circulation created by the pump 24 a rather intensive stream is generated between the oxidizing zone 4 and the anoxidizing zone 22 of the activation and due to the situation of the removal of the activating mixture below the outlet 10 from the return channel 9 by an element of the shape of a collecting cone 31 an intensive stream is created near the outlet 10 which by sucking-off the returned concentrated activated sludge into the activating mixture increases the efficiency of the cleaning process.

Figure 6:
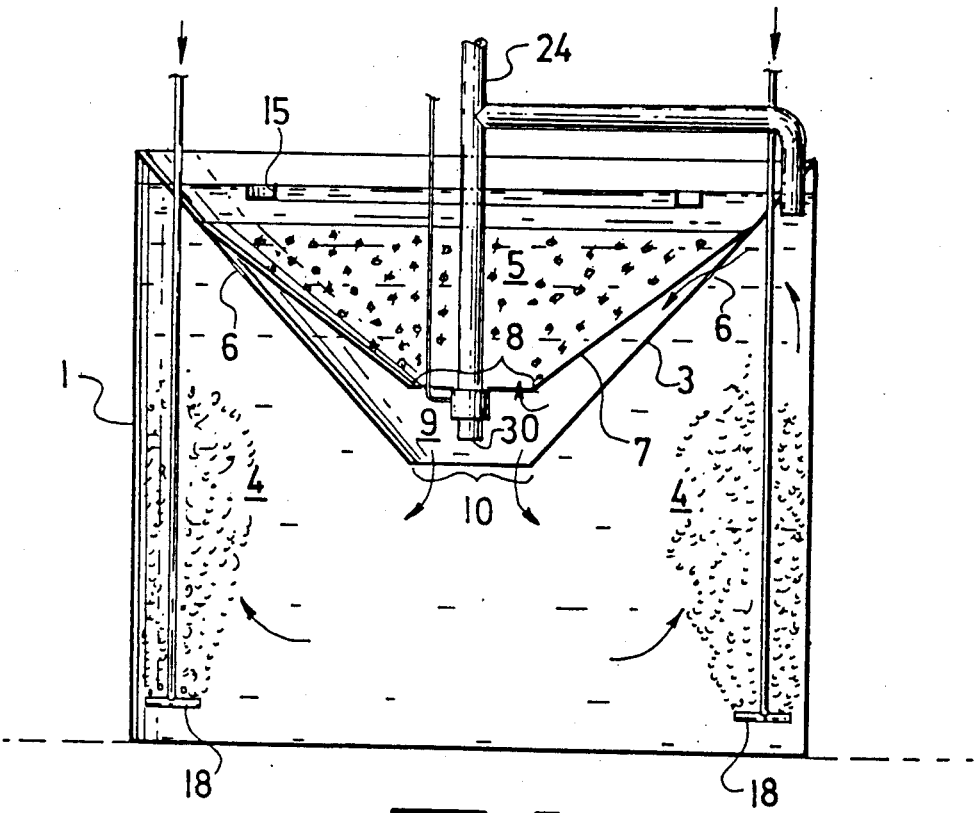
FIG. 6 is a cross-sectional view of a reactor provided with sucking-off of the activated sludge by an air lift pump.

In case of the embodiment shown in FIG. 6 a suction end 30 of the pump 24 is arranged in the lower part of the separation space 5, in the case given of a known air lift pump.

By sucking-off a part of the suspension of the activated sludge returning from the separation space 5 back into the activation an intensification of the cleaning process is achieved. Although this solution is energetically less advantageous than the preceding solutions due to application of more pumps with point action at embodiments with longitudinal outlets 10, it can be particularly applied in case of modernization and intensification of the effectiveness of existing reactors with conical partition walls creating a concentric, downwards narrowing separating space or spaces. The pump 24 can be advantageously started in case of an increased hydraulic load for instance automatically.

The method according to this invention offers a number of advantages. One of principal advantage is the increase of efficiency of separating processes of fluid filters due to intensification of return of returned suspension of activated sludge back into the activation. This increase of efficiency amounts even to 50 to 100% against actually known systems with fluid filters. The increase of efficiency of separation shows in an overall improvement of operational parameters of cleaning stations, reduction of required spaces and the like. The system of forced streaming in order to support the gravitational return of retained activated sludge has a common importance for intensification of arrangements utilizing separation fluid filtration. In addition to said common advantages the method according to this invention, which achieves an intensification of the fluid filtration, offers a number of not less important advantages showing particularly in case of application of fluid filtration for specific cases of water cleaning. The application of the method of forced streaming according to this invention enables, for instance, the construction of a horizontal cylindrical reactor with elimination of "dead" zones in the reactor and the unwelcomed clogging of the inlet slot in case of an interruption of operation. It enables a construction of reliable arrangements for cleaning of local sources of waste waters.

Another important advantage offers the method according to this invention for complex cleaning of waste waters contaminated by nitrogenous materials requiring denitrification. The intensification of separation processes influences not only the improvement of quantitative parameters and the improvement of reliability of operation, but contributes also to an improvement of qualitative indicators by elimination of the mentioned not welcomed post-denitrification in the layer of the fluid filter in case oxidizing conditions are created in this layer.

Said advantages contribute not only to a substantial increase of technical-economical parameters of these reactors, but also to a substantial broadening of possibilities of application of fluid filters in cases where the use of fluid filtration has been up to now prevented by earlier mentioned accompanying unfavorable effects.

We claim:

1. A method of biological activating water cleaning with fluid filtration, comprising:

introducing waste water into a container having both a downwardly converging partition wall positioned within said container and a downwardly converging rectifying wall, said rectifying wall having an exterior surface spaced from an interior surface of said partition wall so as to define a channel, and said rectifying wall having a lower open end;

circulating said waste water such that a stream of said waste water enters an inlet formed in said partition wall and passes through said channel and a first portion of said stream enters a separation zone defined by said rectifying wall and a second portion of said stream exits an opening in said partition wall and contributes to the movement of activated sludge out of the lower open end formed in said rectifying wall; and sucking-off the activated sludge and second portion of said stream exiting the opening in said partition wall with suction means so as to enhance circulation of the activated sludge within said container.

2. A method as recited in claim 1, wherein said activated sludge and said second portion of said stream of waste water are impacted against a cone-shaped barrier positioned below said opening in said partition wall so as to still further enhance circulation of sludge and waste water contained in said container.

3. A method as recited in claim 2, wherein said step of sucking-off activated sludge includes drawing off sludge settling below said cone-shaped barrier and introducing the sludge positioned below said cone-shaped barrier into a second container having an anoxidation zone formed therein and forcing waste water and sludge contained in said second container into said first container.

4. A method as recited in claim 1, further comprising drawing off sludge travelling between the lower open end in said rectifying wall and the outlet opening in said partition wall by positioning an inlet of a suction apparatus between said outlet openings.

5. A method as recited in claim 1 wherein the step of sucking-off the activated sludge and the second portion of said stream includes drawing a fluid from the opening in said partition wall with a pump positioned downstream of said opening.

6. A method as recited in claim 1 wherein the step of sucking-off includes circulating a second stream of said waste water through a connection channel having an outlet adjacent said opening in said partition wall such that the waste water exiting the connection channel assists in drawing fluid out of the opening in said partition wall.

* * * * *